(12) United States Patent
Oliver et al.

(10) Patent No.: US 10,224,741 B2
(45) Date of Patent: Mar. 5, 2019

(54) AUTOMATIC TRANSFER SWITCH MAINTENANCE BYPASS CABINET

(71) Applicant: Walmart Apollo, LLC, Bentonville, AR (US)

(72) Inventors: Corey Cheyne Oliver, Rogers, AR (US); Dale Robert Ayres, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 218 days.

(21) Appl. No.: 15/121,950

(22) PCT Filed: Feb. 27, 2015

(86) PCT No.: PCT/US2015/017996
§ 371 (c)(1),
(2) Date: Aug. 26, 2016

(87) PCT Pub. No.: WO2015/131042
PCT Pub. Date: Sep. 3, 2015

(65) Prior Publication Data
US 2017/0070087 A1    Mar. 9, 2017

Related U.S. Application Data

(60) Provisional application No. 61/946,219, filed on Feb. 28, 2014.

(51) Int. Cl.
*H02J 7/00* (2006.01)
*H02J 9/00* (2006.01)
*H02J 9/06* (2006.01)

(52) U.S. Cl.
CPC ............... *H02J 9/06* (2013.01); *H02J 9/066* (2013.01); *H01H 2300/018* (2013.01)

(58) Field of Classification Search
CPC ....... H02J 9/06; H02J 9/066; H01H 2300/018
(Continued)

(56) References Cited

U.S. PATENT DOCUMENTS 5,581,133 A * 12/1996 Smith ................... H02J 9/00
200/50.09
5,646,459 A * 7/1997 Hatate ................... H02J 9/06
307/45

(Continued)

OTHER PUBLICATIONS

Gary Olson, Bypass transfer switch mechanisms, 2007, pp. 1-9.*
(Continued)

*Primary Examiner* — Rexford Barnie
*Assistant Examiner* — Toan Vu
(74) *Attorney, Agent, or Firm* — McCarter & English, LLP; David R. Burns

(57) ABSTRACT

According to an embodiment, an automatic transfer switch bypass breaker system can include a switch gear configured with an automatic transfer switch electrically coupled to a first power sources and to a common load bus. The automatic transfer switch bypass breaker system can further include an automatic transfer switch bypass breaker electrically coupled to the first power source and to the common load bus and a utility bypass breaker electrically coupled to the first power source and to the common load bus. The utility bypass breaker can be configured for supplying power from the first power source directly to the common load bus.

16 Claims, 4 Drawing Sheets

(58) Field of Classification Search
USPC .......................................................... 307/64
See application file for complete search history.

(56) References Cited

U.S. PATENT DOCUMENTS

| | | | |
|---|---|---|---|
| 5,811,960 A * | 9/1998 | Van Sickle | H02J 9/066 307/67 |
| 6,131,423 A | 10/2000 | Xenaki et al. | |
| 6,995,327 B1 | 2/2006 | Shepstone et al. | |
| 8,212,404 B2 | 7/2012 | Zajkowski | |

OTHER PUBLICATIONS

Office Action from Mexico related patent application No. MX/a/2016/011168 dated Feb. 20, 2018.
International Search Report and Written Opinion from related PCT application PCT/US2015/017996 dated Jun. 19, 2015.
International Preliminary Report on Patentability issued in related international patent applciation No. PCT/US2015/017996 dated Sep. 15, 2016.

* cited by examiner

AUTOMATIC TRANSFER SWITCH MAINTENANCE BYPASS CABINET

CROSS-REFERENCE TO RELATED PATENT APPLICATIONS

This application is a 35 U.S.C. § 371 National Stage filing of International Application No. PCT/US2015/017996, filed on Feb. 27, 2015, which claims priority to U.S. Provisional Application No. 61/946,219 filed on Feb. 28, 2014, the content of each application is hereby incorporated by reference in its entirety.

RELATED APPLICATIONS

The present application claims priority to U.S. Provisional Patent Application Ser. No. 61/946,219 filed Feb. 28, 2014, entitled "Automatic Transfer Switch Maintenance Bypass Cabinet", the contents of the identified application are hereby expressly incorporated by reference in their entirety.

FIELD OF INVENTION

Embodiments of the present disclosure relate generally to transfer switches for use with electrical distribution systems and more particularly to a bypass breaker that provides automatic transfer switch transitions.

BACKGROUND

An automatic transfer switch is a switch that can transfer a power source from a first source to a second source when a disturbance is sensed in a power transmission. A conventional automatic transfer switch includes coupling the primary power source and a backup power source to the transfer switch to provide temporary power to the load if the primary source fails. A conventional automatic transfer switch can include a bypass isolation open or closed transition system that switches between a load and two sources of power.

In conventional approaches, some facilities may have power systems structured to provide an uninterruptable power supply. The primary source may be the power utility and the backup source may be a backup power source. Power can be supplied over a period of time from both sources. During maintenance of a conventional automatic transfer switch the entire facility must be taken off line or the facility may have power supplied from one source but removing the backup capabilities of the system.

SUMMARY

Taught herein are apparatus and methods that utilize an automatic transfer switch bypass breaker to electrically isolate an automatic transfer switch from a power source and a load. Isolation of the automatic transfer switch can allow for maintenance operations to be performed on the automatic transfer switch without disrupting the power supply to the facility, or reducing the redundancy of the system by removing a second source of power. For example, exemplary embodiments can be directed to decoupling a plurality of power sources and a load from the automatic transfer switch and configuring a bypass breaker to provide power directly to the load.

Embodiments taught herein are directed to an automatic transfer switch bypass breaker system for isolating the automatic transfer switch from the first power source, the second power source, and the load receiving power from one of the power sources. The automatic transfer switch bypass breaker system includes a switch gear configured with an automatic transfer switch electrically couplable to a first power source and a common load bus. The automatic transfer switch bypass breaker system includes an automatic transfer switch bypass breaker electrically couplable to the first power source and to the common load bus and a utility bypass breaker electrically couplable to the first power source and the common load bus. The first power source can be a utility power source or a generator power source.

In some embodiments, the automatic transfer switch bypass breaker may include a bypass switch for supplying power from the first power source directly to the common load bus. In some embodiments, an emergency bypass breaker can supply power directly from an emergency or backup power source directly to the load. For example, the first power source can be decoupled when the emergency or backup power source is engaged. In some embodiments, the utility bypass breaker can be external to the switch gear configured with the automatic transfer switch.

In some embodiments, a mechanical key system can be used to engage the first power source to supply power directly to the load and to electrically isolate the switch gear configured with the automatic transfer switch and the automatic transfer switch bypass breaker from the common load bus. In some embodiments, a mechanical key system can be used to engage the emergency bypass breaker for supplying power from the emergency power supply to the load and electrically isolating the switch gear configured with the automatic transfer switch, the automatic transfer switch bypass breaker and the first power source.

In another aspect, embodiments taught herein are directed to a method of operating the automatic transfer switch bypass breaker system for isolating the automatic transfer switch from a power source while the system continues to provide power to a load. The method includes physically decoupling and electrically isolating the automatic transfer switch from a first power source, a second power source and a common load bus. The first power source can be physically and electrically coupled to an automatic transfer switch bypass breaker and supply power to the common load bus. Electrical and physical isolation of the first power source, the second power source and the common load bus can be maintained from the automatic transfer switch while the first power source provides power to the common load bus.

In some embodiments, a normal bypass operation of the first power source can be disrupted. In some embodiments, an emergency bypass operation can be initiated. In some embodiments, the emergency bypass operation can be disrupted.

In some embodiments, a kirk key system can physically and electrically isolate a component of an automatic transfer switch bypass breaker system. A kirk key system can include any mechanical or electro-mechanical interlocks, solenoid key releases, time delay releases or transfer panels or the like.

In some embodiments, a bypass breaker control system can terminate a bypass operation. The first power source and the second power source can be physically and electrically coupled to the automatic transfer switch to supply power through the automatic transfer switch to the common load bus.

Any combination or permutation of embodiments is envisioned. Other objects and features will become apparent from the following detailed description considered in conjunction with the accompanying drawings, wherein like reference numerals identify like elements. It is to be understood, however, that the drawings are designed as an illustration only and not as a definition of the limits of the present disclosure.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
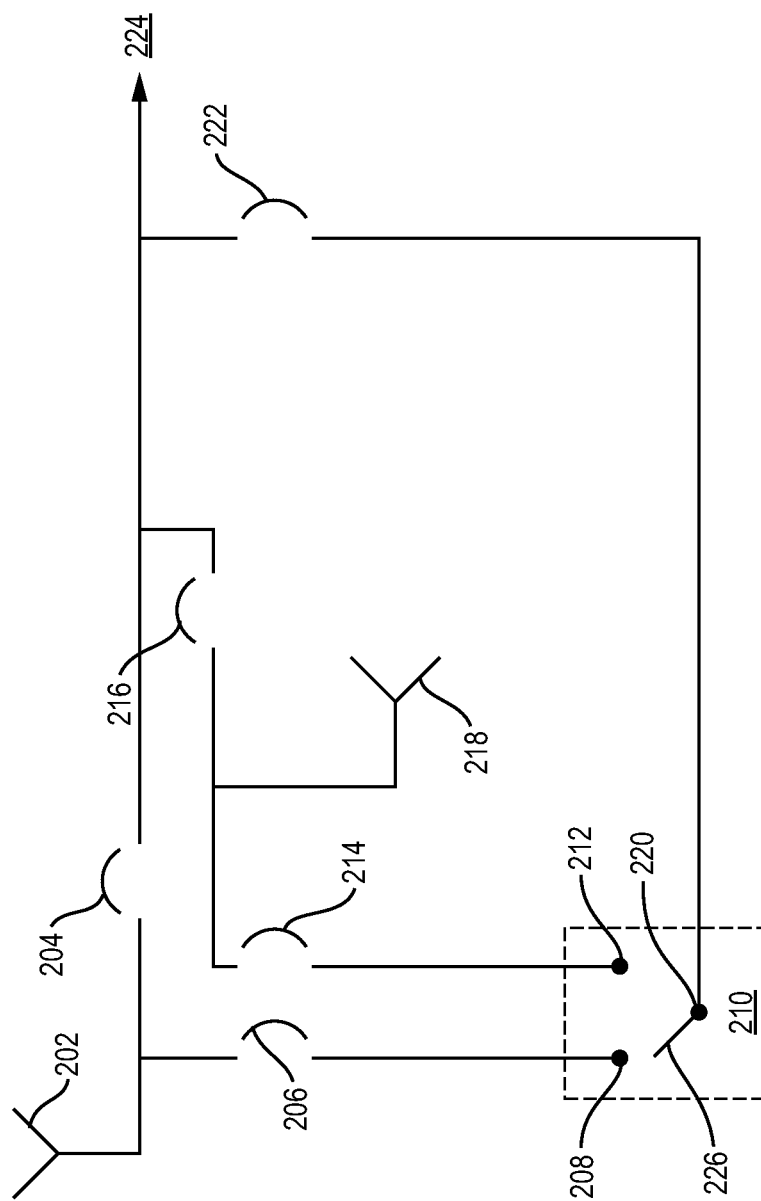
FIG. 1 is a schematic diagram of an exemplary power system suitable for implementation of the exemplary embodiments.

Embodiments taught herein, include or use a utility bypass breaker for transferring power between a plurality of power sources, a common load bus and an automatic transfer switch configured to isolate the automatic transfer switch and the automatic transfer switch bypass breaker from the power sources and the common load bus. Embodiments taught herein relate to systems and methods for transferring power between multiple power sources, the common load bus, the automatic transfer switch, the automatic transfer switch bypass breaker and a utility bypass breaker. Some embodiments taught herein may use power supplied from a power utility, power supplied from a cogeneration facility or power supplied from an onsite generation device. An onsite generation device may include power generation through alternative energy technologies such as photovoltaic solar converters, wind generation or hydroelectric generation devices.

Some embodiments taught herein may include power supplied from an auxiliary or back up power supply. An auxiliary or backup power supply may include an emergency generator, a power distribution unit, or an uninterruptable power supply. In some embodiments the auxiliary power supply may include power supplied from a power utility, power supplied from a cogeneration facility or power supplied from an onsite generation device. Some embodiments can include a single common load bus or a plurality of loads. Some embodiments taught herein can include a bypass breaker with simultaneous switching capabilities. Simultaneous switching can include transferring power from a first source to a second source without disrupting power to the load. The bypass breaker may be configured for automatic switching or may be configured for manual switching.

An automatic transfer switch bypass breaker system in accordance with embodiments taught herein can include a switch gear configured with an automatic transfer switch electrically couplable to a first power source and a common load bus. The automatic transfer switch bypass breaker system can also include an automatic transfer switch bypass breaker and a utility bypass breaker both electrically couplable to the first power source and to the common load bus. For example, enablement of a method of operating an automatic transfer switch bypass breaker for isolating the automatic transfer switch from the power source and the load allows scheduled maintenance and servicing of the automatic transfer switch and the automatic transfer switch bypass breaker. Scheduled maintenance and service of the components of a commercial, residential, industrial or institutional facility power system improves operational capabilities and prevents power disruptions due to component failures and system downtime. The embodiments taught herein allow scheduled maintenance to occur on automatic transfer switch of an electrical switch gear without electrical system downtime, which, in turn allows business operations to continue while the maintenance or repair is performed.

FIG. 1 is a schematic diagram of an exemplary automatic transfer switch bypass breaker system 200 suitable for implementation of the exemplary embodiments. As shown in FIG. 1, the automatic transfer switch bypass breaker system 200, includes four operational states. The automatic transfer switch bypass breaker system includes a normal operation state, an emergency bypass operation state, a normal bypass operation state, and an emergency operation state. The automatic transfer switch bypass breaker system can include a switch gear having a switching function transferring power directly from a first power source or an auxiliary power source to a load bypassing an automatic transfer switch. The automatic transfer switch bypass breaker can include a first power source 202, a breaker 204, a normal switch 206, an automatic transfer switch 210, an internal switch wiper 226, an emergency breaker 214, an emergency bypass breaker 216, a secondary power source 218 for example a generator, a load breaker 222 and a common load bus connection 224. The automatic transfer switch can be configured with a first input contact 208, a second input contact 212, an internal switch wiper 226 and an output contact 220. The switches discussed herein may comprise mechanical switches, such as a breaker, electronics switches such as a silicon controlled rectifier or any number of other devices that can be adapted to transfer power. System 200 may be implemented, for example, in a commercial, industrial, residential or institutional facility and access multiple power sources or load configurations.

As shown in FIG. 1, the automatic transfer switch bypass breaker system 200, can be configured for a normal operation state. The normal operation state includes power conditions and system power requirements. In the present embodiment, the system 200, can be configured to receive power from the first power source 202 and transfer the power to the breaker 206, which is configured in a closed position and is electrically coupled to the first input contact 208 of the automatic transfer switch 210. During normal operation, power can be received at the first input contact 208. The internal switch wiper 226 can be configured to provide a connection between the first input contact 208 and the output contact 220. Power can be transferred from the output contact 220 of the automatic transfer switch 210 to the load breaker 222 that can be coupled to the load 224. During normal operation, the load breaker 222 remains in a closed position to allow power transmission from the automatic transfer switch 210 to the load 224. To provide backup generation power, the emergency breaker 214 can be coupled to the secondary power source 218 and the second input contact 212 of the automatic transfer switch 210 and remains in a closed position. When the system 200 functions in normal operation mode, the breaker 204 is coupled to the first power source 202 and the load 224 remains open.

During normal operation, the emergency bypass breaker 216 is coupled to the secondary power source 218 and the load 224 remains open.

As further shown in FIG. 1, the automatic transfer switch bypass breaker system 200 can be configured for an emergency bypass operation state. A disruption to the baseline power conditions or system components can cause the automatic transfer switch bypass breaker system 200 to operate in the emergency bypass operation state. A disruption to the power supply 202, or the failure of the automatic transfer switch 210 can necessitate transferring power directly from the secondary power source 218 through the closed emergency bypass breaker 216 to the load 224. The power disruption may include preventative maintenance on a system component, a component failure or a disruption to the first power source 202.

In the emergency bypass operation state, power can be supplied from a second power source 218. The second power source 218 can include an alternate utility power, an auxiliary power system, renewable power, a generator, a battery system, or an uninterruptible power supply. In some embodiments, in an emergency bypass operation state, the breaker 206 can be open, isolating power from the first input contact 208 of the automatic transfer switch 210. The normal bypass breaker 204 can be open, electrically isolating the first power source 202 from the load 224. In an emergency bypass operation state, the emergency switch 214 can be open, electrically isolating the second input contact 212 of the automatic transfer switch 210. In an exemplary embodiment, the load switch 222 can be open, electrically isolating the load 224 from the automatic transfer switch 210.

Still referring to FIG. 1, automatic transfer switch bypass breaker system can be configured for a normal bypass operation. A disruption to the baseline power conditions or system components can cause the automatic transfer switch bypass breaker system 200 to operate in a normal bypass operation state. The power disruption may be attributed to preventative maintenance on a system component, such as the automatic transfer switch 210 or a component failure of the automatic transfer switch 210. During the normal bypass operation, power can be transferred from the first power source 202 through closed breaker 204 to the load 224. For example, during a normal bypass operation state the breaker 206 can be open, electrically isolating power from the first input contact 208 of the automatic transfer switch 210. In a normal bypass operation state, the emergency breaker 214 can be open to electrically isolate the second input contact 212 of the automatic transfer switch 210. The emergency bypass breaker 216 can be open, electrically isolating the secondary power source 218 from the load. In an exemplary embodiment, the load breaker 222 can be open, electrically isolating the load 224 from the automatic transfer switch 210. To provide continuous power to the load 224, the breaker 204 can be can be in a closed position, thereby allowing power transmission from the first power source 202, through the breaker 204 to the load 224.

As further shown in FIG. 1, the automatic transfer switch bypass breaker can be configured for an emergency operation state. A disruption to the power supply 202 can necessitate transferring power directly from the secondary power source 218 through second contact 212 to the automatic transfer switch 210 to the breaker 222 to the load 224. During the emergency bypass operation, power can be supplied from a second power source which can include an alternate utility power, an auxiliary power system, renewable power, a generator, a battery system, or an uninterruptible power supply.

For example, during normal operation, the emergency breaker 214 can be coupled to the second input contact 212 while an emergency bypass breaker 216 remains open. The emergency breaker 214 can provide continuous power to the load if a disruption occurs to the first power source 202 or electrical isolation of the first power source 202 is required. If disruption occurs to the first power source 202, transition from the normal operation state to the emergency bypass operation state can electrically couple the second input contact 212 to the output contact 220 by internal switch wiper 226 of the automatic transfer switch 210. When the system 200 is in an emergency backup operation state, the automatic transfer switch 210 can transmit power through the output contact 220 through the breaker 222 electrically coupled to the load circuitry 224. During the emergency operation, the breaker 222 electrically coupled to the load circuitry can remain closed allowing power transmission to the load 224.

In some embodiments, in an emergency operation state, the breaker 206 can be open, isolating power from the first input contact 208 of the automatic transfer switch 210. The normal bypass breaker 204 can be open, electrically isolating the first power source 202 from the load 224. In the emergency operation state, the emergency bypass breaker 216 remains open, thereby electrically isolating the second power source from supplying power directly to the load 224.

In some embodiments, the automatic transfer switch 210 can be electrically isolated from the power source 202 or the load 222 by physically locking the bypass breaker 216 or decoupling the breaker 214 from the system 200. In some embodiments, a key interlock member or the like can be used to isolate the automatic transfer switch 210 from the system 200. For example, a key interlock member may be a kirk key system. The bypass breaker 216 can include a plurality of sensors disposed throughout the system to sense when the automatic transfer switch is electrically isolated.

Additional isolating switches may be disposed throughout the system for further back up isolation protection. Mechanical key locking systems can be disposed through the system to physically and electrically isolate portions of the system. A control system including multiple sensors may be disposed throughout the system to monitor the physical and electrical isolation of portions of the system.

Figure 2:
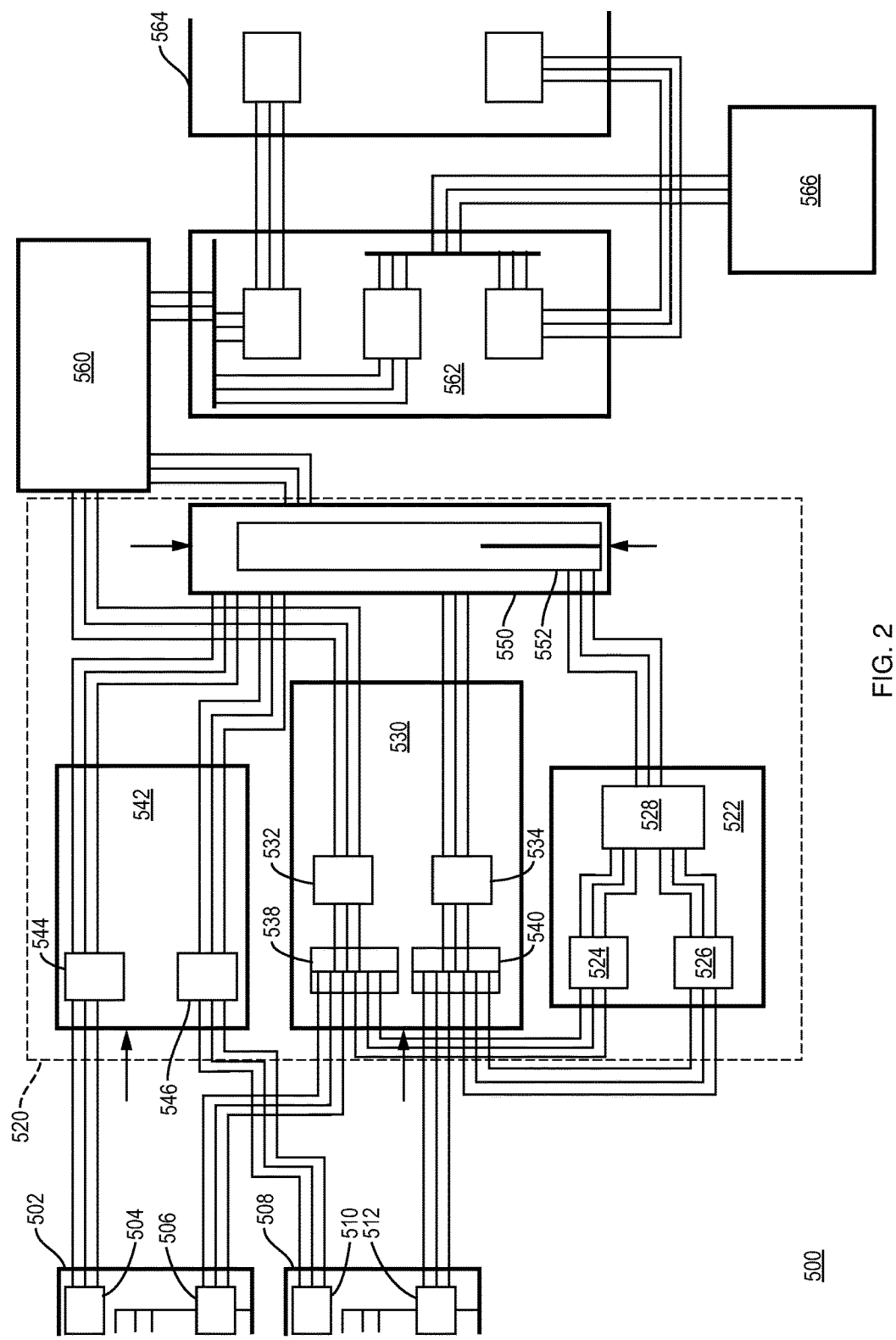
FIG. 2 is a block diagram of an exemplary arrangement of a bypass breaker in a facility power control system in accordance with exemplary embodiments.

FIG. 2 is a block diagram of an exemplary arrangement of an automatic transfer switch bypass breaker system in a facility power control system in accordance with embodiments of the present disclosure. The automatic transfer switch bypass breaker system can supply power from a primary or a secondary source of power, through an automatic transfer switch or a plurality of breakers, transferring power to a load. In some embodiments the automatic transfer switch can be configured with a normal operation state (function and condition), a normal bypass operation state (function and condition), an emergency bypass operation state (function and condition) and an external bypass state (function and condition).

As depicted in FIG. 2, an automatic transfer switch bypass breaker environment 500 can include a first power source connection 502, a second power source connection 508, an automatic transfer switch bypass breaker system 520 and an emergency panel system 568. The first power source 502 can be coupled to a primary breaker 504 and a secondary breaker 506 the second power source 508 can include a primary breaker 512 and a secondary breaker 510. The system further includes an automatic transfer switch system 520 that can include an automatic transfer switch 522, an automatic transfer switch bypass breaker 530, an utility bypass breaker 542. The emergency panel system 568 can include an emergency panel 560 a plurality of configuration switches 562, an uninterruptable power supply 564 and a power distribution unit 566.

The automatic transfer switch 522 can include a first breaker 524, a second breaker 526 and a third breaker 528. The automatic transfer switch bypass breaker 530 can include a first common bus input 538, a second common bus input 540, a first breaker 532, and a second breaker 534. The utility bypass breaker 542 can include a first breaker 544, and a second breaker 546. The common load bus 550 can include a breaker 552. The system can further include an emergency panel 560 that can include a plurality of configuration switches 562, an uninterruptable power supply 564 and a power distribution unit 566.

In an exemplary embodiment, the first power source 502 is electrically coupled to a first breaker 506 which can be electrically coupled to the common bus input 538 of the automatic transfer switch bypass breaker 530. The first power source 502 can be electrically coupled to the second breaker 504 which can be electrically coupled to the first breaker 544 of the utility bypass breaker 542. In an exemplary embodiment, the second power source 508 can be electrically coupled to the first breaker 512 which can be electrically coupled to the second common bus input 540 of the automatic transfer switch bypass breaker 530. The second power source 508 can be electrically coupled to the second breaker 510 which can be electrically coupled to the second breaker 546 of the utility bypass breaker 542.

In some embodiments, the first power source 502 and the second power source 508 may supply power simultaneously. In some embodiments, the first power source and the second power source may alternate supplying power at differing intervals or cycles. For example, in some embodiments, a first power source may be used to supply power that can have power irregularities, for example, irregularities in a power form factor. A secondary power source may be used when power irregularities are detected in the power supplied from the primary power source.

In an exemplary embodiment, the automatic transfer switch bypass breaker system 520 can include the automatic transfer switch 522. The first breaker 524 of the automatic transfer switch 522 can be electrically couplable to the common bus input 538 of the automatic transfer switch bypass breaker 530. The second breaker 526 can be electrically couplable to the second common bus input 540 of the automatic transfer switch bypass breaker 530. The first breaker 524 and the second breaker 526 can be electrically couplable to the third breaker 528. The third breaker 528 can be electrically couplable a breaker 552 of the common load bus 550.

In an exemplary embodiment, the common bus input 538 of the automatic transfer switch bypass breaker 530 can be electrically couplable to the first breaker 506 associated with the first power source 502 and the first breaker 524 of the automatic transfer switch 522. The second common bus input 540 can be electrically couplable to the first breaker 512 associated with the second power source 508 and the second breaker 526 of the automatic transfer switch 522. The common bus input 538 can be electrically couplable to the first breaker 532 and the second common bus input 540 can be electrically couplable to the second breaker 534. The output contact of the first breaker 532 can be electrically couplable to the emergency panel 560 and the second breaker 534 can be coupled to a breaker 552 of the common load bus 550 either separately or simultaneously.

In an exemplary embodiment, the first breaker 544 of the utility bypass breaker 542 can be electrically couplable to the second breaker 504 of the first power source 502. The second breaker 546 that can be electrically couplable to the second breaker 510 of the second power source 508. The first breaker 544 and the second breaker 546 can be electrically couplable to a breaker 552 of the common load bus 550 either separately or simultaneously.

The automatic transfer switch bypass breaker environment 500 can include a common load bus 550, a panel board 550 having a first breaker 552 that can be electrically couplable to third breaker 528 of the automatic transfer switch 522, electrically couplable to a breaker 534 of the automatic transfer switch bypass breaker 530 and electrically couplable to the breakers 544, 546 of the utility bypass breaker 542.

In an exemplary embodiment, the panel board 550 can be electrically couplable to the emergency panel 560. The emergency panel 560 can be electrically couplable to the configuration switches 562 that can be electrically couplable to the uninterruptable power supply 564 and the power distribution unit 566. In some embodiments, the automatic transfer switch configuration 520 can engage the emergency panel system 568 to provide power to prevent service disruption to a facility.

In some embodiments, the utility bypass breaker 542 can be configured to allow for scheduled or unscheduled repair work to be performed on the automatic transfer switch 522 or the automatic transfer switch bypass 530 without disruption to the power to the facility.

In some embodiments, the system 520 can include a plurality of sensors disposed throughout the system 520. The system 520 can include electrical couplings configured with a quick disconnect. The components of the system 520 can be configured to be in electrical communication with the switching assemblies including the automatic transfer switch and the bypass breaker.

In some embodiments, the system 520 may include a control system having a programmable logic circuit or a memory device. The control system can be disposed throughout the system coupled to the switching components. Control signals can be sent to the switching components to alter the power configurations. The control system may be accessed remotely and can be controlled via wireless communication.

Figure 3:
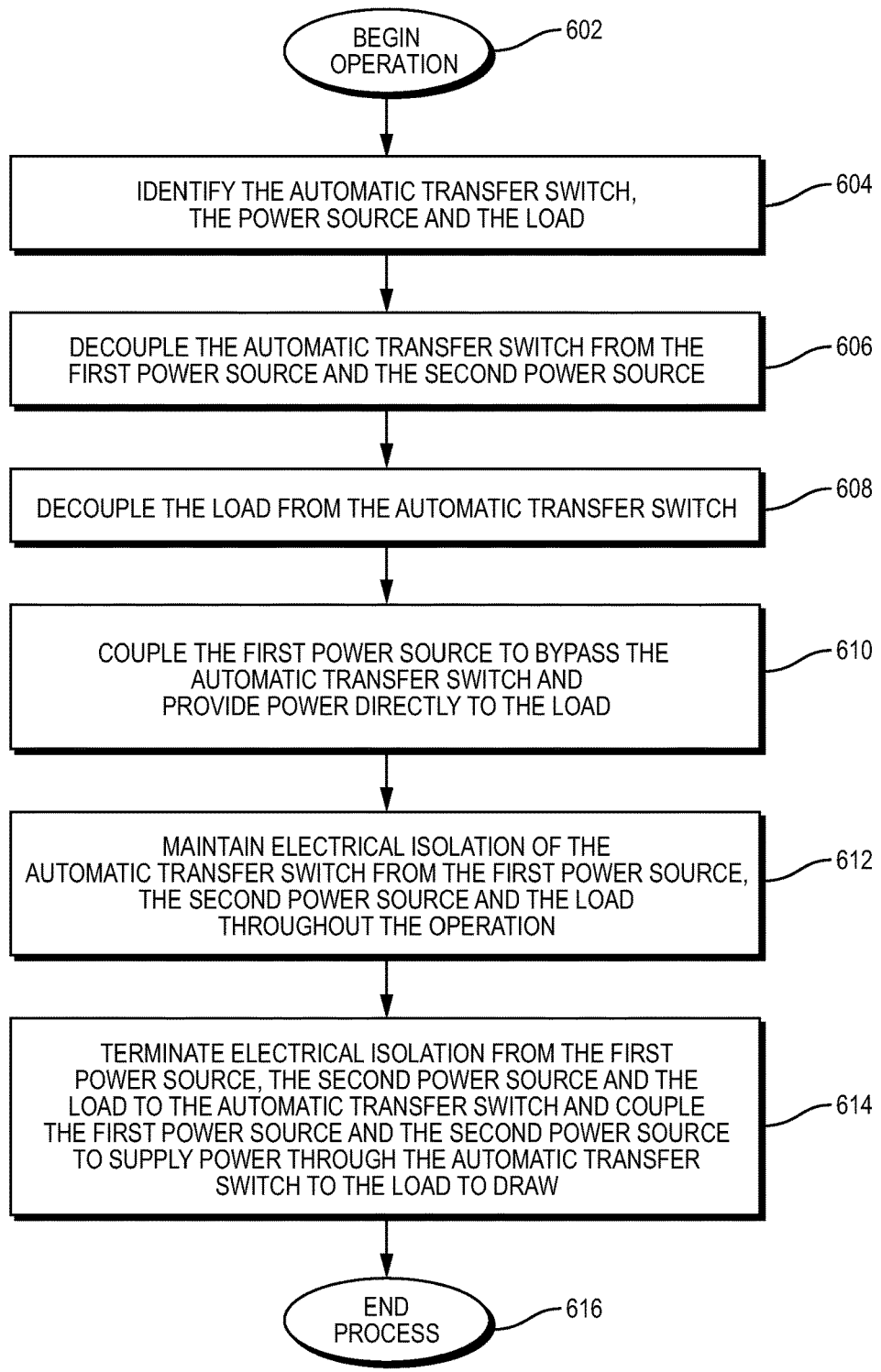
FIG. 3 is an exemplary flow diagram of a bypass breaker in the exemplary embodiments.

FIG. 3 is a flow diagram of an exemplary process for operating an automatic transfer switch bypass breaker in an environment supplying power to a facility as taught herein. The exemplary process isolates the automatic transfer switch and the automatic transfer switch bypass breaker while maintaining power to the electrical loads in the facility. The automatic transfer switch bypass breaker environment can receive power from a first power source and a second power source, and can include an automatic transfer switch, an automatic transfer switch bypass breaker external to the automatic transfer switch, a utility bypass breaker and a load. The process may be implemented, for example, for a single automatic transfer switch or across a plurality of automatic transfer switches. The process may be implemented across a single primary power source or across a plurality of primary power sources. The process may include a single secondary power source or a plurality of secondary power source sources. The process may include a single load configuration or a plurality of load configurations. The exemplary process is described in conjunction with the exemplary schematics of FIGS. 1 and 2.

At step 602, the process may begin. At step 604, the automatic transfer switch 210, the first power source 202 and the load 224 are identified. For example, the first power source 202 may include a single source such as power generated within the facility, utility power or renewable power sources or may include a combination of different power generation sources. At step 606, the automatic transfer switch 210 is decoupled from the first power source 202 and the second power source 218. For example, decoupling the first and the second power source 202, 218 can be accomplished by using a mechanical or electrical switch to isolate the automatic transfer switch 210. A key interlock member may be employed to physically isolate and decouple the power from the automatic transfer switch. At step 608, the load 224 can be decoupled from the automatic transfer switch 210.

At step 610, the first power source 202 can bypass the automatic transfer switch and provide power directly to the load 224. For example, steps 606, 608 and 610 can be performed simultaneously or nearly simultaneously with switching algorithms to prevent disruption in the power supplied to the load 224. At step 612, the electrical isolation of the first and the second power source 202, 218 and the load is maintained from the automatic transfer switch while the first power source 202 provides power directly to the load 224.

At step 614, the electrical isolation from the first power source 202, the second power source 218 and the load 224 to the automatic transfer switch is terminated. The first power source 202 and the second power source 218 are electrically coupled to the automatic transfer switch 210 and the load 224 may draw power through the automatic transfer switch 210. The process ends at step 616.

Figure 4:
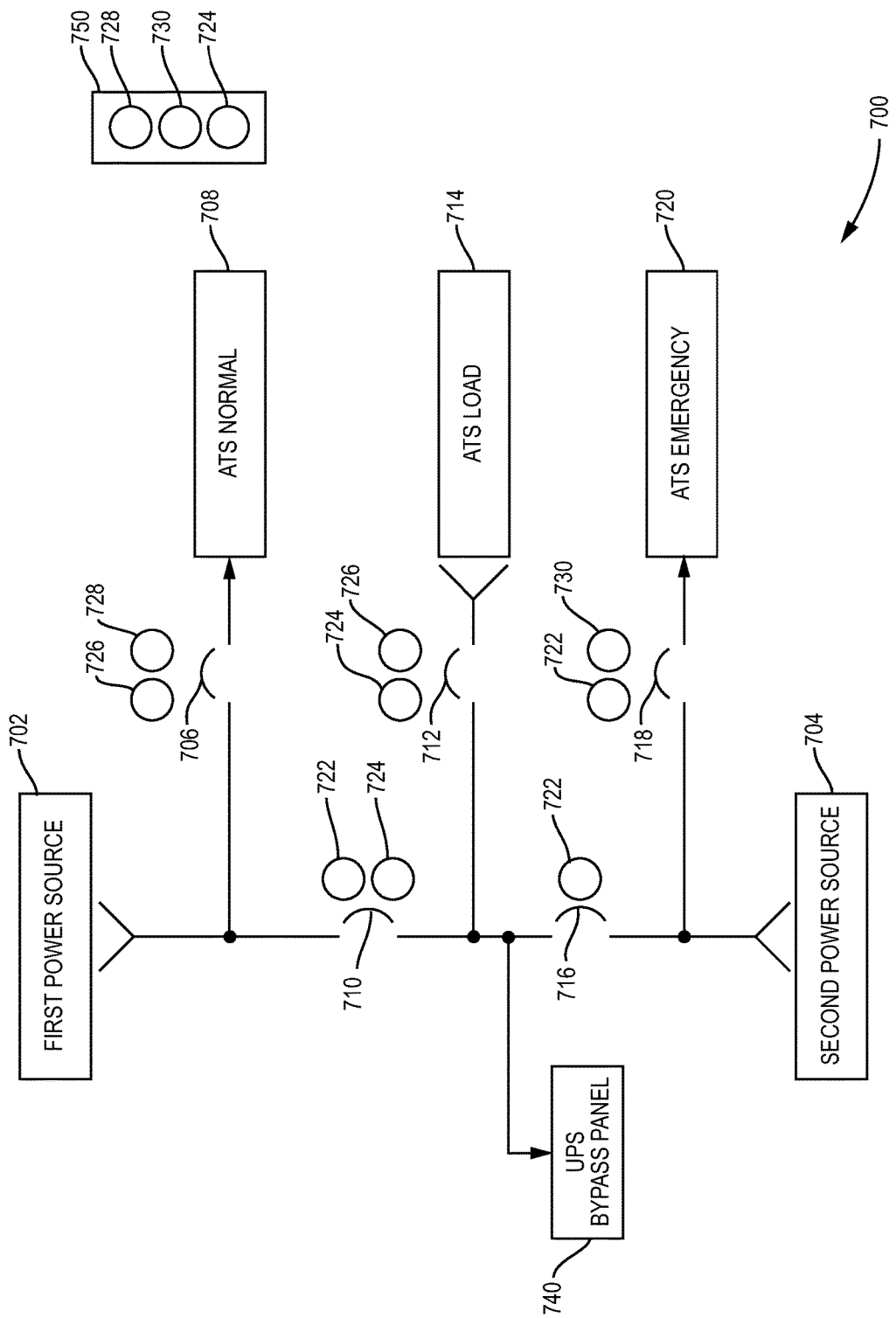
FIG. 4 is a schematic diagram of an exemplary power system with a mechanical lockout system suitable for implementation of the exemplary embodiments.

FIG. 4 is a schematic diagram of an exemplary power system 700 with a mechanical lockout system suitable for implementation of the exemplary embodiments. In some embodiments, as shown in FIG. 4, the exemplary power system 700 can include a power feed from a first power source 702, a power feed from a second power source 704, a power feed to an automatic transfer switch 708, a power feed from an automatic transfer switch 714, and a power feed to an emergency breaker 720. The system can further include a first breaker 706, a second breaker 710, a common load bus 715, an emergency bypass breaker 716, an emergency breaker 718, a first key interlock member 722, a second key interlock member 724, a third key interlock member 726, a fourth key interlock member 728 and a sixth key interlock member 730. The structure and function of the particular elements are explained in further detail below.

As depicted in FIG. 4, the first power source 702 can be electrically coupled to the first breaker 706 that can be mechanically connected to the third key interlock member 726, and the fourth key interlock member 728 and can be electrically coupled to the automatic transfer switch 708. The first power source 702 can be electrically coupled to the second breaker 710 that can be mechanically connected to the first key interlock member 722 and the second key interlock member 724. The load side of the second breaker 710 can be electrically coupled to a load breaker 712 that can be mechanically coupled to the second key interlock member 724 and the third key interlock member 726. The load breaker 712 can be electrically coupled to the load side of the automatic transfer switch 714. The output of the second breaker 710 and the load breaker 712 can be electrically coupled to the load 740.

Still referring to FIG. 4, the second power source 704 can transmit power to the emergency breaker 718 that can be mechanically coupled to the first key interlock member 722 and a sixth key interlock member 730, and the output can be electrically coupled to the emergency breaker 720. The second power source 704 can transmit power to the emergency bypass breaker 716 that can be mechanically coupled to the first key interlock member 722 having an output electrically coupled to the bypass panel 740.

As shown in FIG. 4, the automatic transfer switch bypass breaker system 700 can be configured to transition from a normal automatic transfer switch state to a normal bypass state. The automatic transfer switch may require electrical isolation to periodically conduct repairs or preventative maintenance operations. In the normal bypass state the second power source 704 can be electrically isolated from the power transmission by electrically decoupling the emergency breaker 718 into an open position by disengaging the first key interlock member 722 and the sixth key interlock member 730. The sixth key interlock member 730 can be stored in the transition block 750 that is a hold over area for disengaged locking elements. The second breaker 710 can be placed in the closed position by inserting the first key interlock member 722. The load breaker 712 can be placed in an open position by disengaging the third key interlock member 726 and inserting the second key interlock member 724. The normal breaker 706 can be placed in an open position by disengaging the fourth key interlock member 728 and engaging the third key interlock member 726. The fourth key interlock member 728 can be stored in the transition block 750. Upon completion of the transition sequence the automatic transfer switch can be electrically isolated from the power transmission.

Referring to FIG. 4, the automatic transfer switch bypass breaker system 700 can be configured to transition from a normal bypass state to a normal automatic transfer switch state. In the normal bypass state, the second power source 704 can be closed to electrically couple the second power source 704 to the automatic transfer switch bypass breaker system. During the transition to the normal bypass state, the second breaker 710 can be closed, thereby electrically coupling the first power source 702 to the automatic transfer switch bypass breaker system. The transition can include mechanically engaging and disengaging the second key interlock member 724, with the transition block 750 to disengage the fourth key interlock member 728 from the transition block 750. The first breaker 706 can be placed in a closed position by engaging the fourth key interlock member 728 and disengaging the third key interlock member 726. The load breaker 712 can be placed in a closed position by engaging the third key interlock member 726 and disengaging the second key interlock member 724. The second breaker 710 can be placed in an open position by engaging the second key interlock member 724 and disengaging the first key interlock member 722. The emergency breaker 718 can be placed in an open position by engaging the first key interlock member 722 and disengaging the sixth key interlock member 730. The sixth key interlock member 730 can be placed in the transition block 750 and the system can resume normal automatic transfer switch operation.

As depicted in FIG. 4, the automatic transfer switch bypass breaker system 700 can be configured to transition from a normal bypass state to an emergency bypass state. In the emergency bypass state, the second power source 704 can transmit power to the automatic transfer switch bypass breaker system 700. The transition can include mechanically engaging the fourth key interlock member 728 and the sixth key interlock member 730 in the transition block 750 and mechanically disengaging the second key interlock member 724. The second breaker 710 can be placed in an open position by engaging the second key interlock member 724 and disengaging the first key interlock member 722. The emergency bypass breaker 716 can be placed in a closed position by engaging the first key interlock member 722 and the second power source 704 can supply power to the automatic transfer switch bypass breaker system 700.

As depicted in FIG. 4, the automatic transfer switch bypass breaker system 700 can be configured to transition from an emergency bypass state to a normal bypass state. Utility power can be restored to an emergency bypass state by placing the emergency bypass breaker 716 in an open position and disengaging the first key interlock member 722. The second breaker 710 can be placed in a closed position by engaging the first key interlock member 722 and disengaging the second key interlock member 724. The second key interlock member 724 can be engaged with the transition block 750 and the utility power is supplied to the automatic transfer switch bypass breaker system.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An automatic transfer switch bypass breaker system comprising:
   a switch gear configured with an automatic transfer switch electrically couplable to a first power source and to a common load bus;
   an automatic transfer switch bypass breaker electrically couplable to the first power source and to the common load bus; and
   an utility bypass breaker electrically couplable to the first power source and to the common load bus, wherein the utility bypass breaker further comprises:
   a first breaker having an input coupled to the first power source and an output coupled to the common load bus; and
   a second breaker having an input coupled to a second power source and an output coupled to a first input contact of the automatic transfer switch.

2. The automatic transfer switch bypass breaker system of claim 1, wherein the automatic transfer switch comprises:
   a first input contact for receiving power from the first power source;
   a second input contact for receiving power from a second power source; and
   an output breaker having an input coupled to the first input contact and the second input contact and an output coupled to the common load bus.

3. The automatic transfer switch bypass breaker system of claim 1, wherein the automatic transfer switch bypass breaker further comprises:
   a first common bus input contact coupled to a first input contact of the automatic transfer switch for receiving power from the first input power source;
   a second common bus input contact coupled to a second input contact of the automatic transfer switch for receiving power from a second input power source;
   a first output breaker having an input coupled to the output of a first common bus input contact and an output coupled to the common load bus; and
   a second output breaker having an input coupled to the output of the second common bus input contact and an output coupled to an emergency power source.

4. The automatic transfer switch bypass breaker system of claim 1, further comprising a utility power source.

5. The automatic transfer switch bypass breaker system of claim 1, further comprising a generator power source.

6. The automatic transfer switch bypass breaker system of claim 1, further comprising a mechanical key system for electrically and physically isolating at least one of a component of the automatic transfer switch bypass breaker system, the first power source or the common load bus.

7. The automatic transfer switch bypass breaker system of claim 1, further comprising a mechanical key system for engaging the first power source to supply power directly to the common load bus and electrically isolate the automatic transfer switch and the utility bypass breaker.

8. The automatic transfer switch bypass breaker system of claim 1, further comprising an emergency bypass breaker for supplying power from an emergency power source to the common load bus.

9. The automatic transfer switch bypass breaker system of claim 8, further comprising a mechanical key system for engaging the emergency bypass breaker for supplying power from the emergency power supply to the common load bus and electrically isolating the automatic transfer switch, the utility bypass breaker and the first power source.

10. The automatic transfer switch bypass breaker system of claim 1, wherein the utility bypass breaker is configured to be external to the switch gear configured with an automatic transfer switch.

11. A method of operating an automatic transfer switch bypass breaker system to isolate the automatic transfer switch from a power source while providing power to a common load bus, the method comprising:
    physically decoupling and electrically isolating the automatic transfer switch from a first power source and a second power source;
    physically decoupling and electrically isolating a common load bus from the automatic transfer switch;
    physically and electrically coupling the first power source to an automatic transfer switch bypass breaker and to supply power to the common load bus;
    maintaining physical and electrical isolation of the first and the second power source and the common load bus from the automatic transfer switch while the first power source supplies power to the common load bus;
    initiating an emergency bypass operation;
    physically and electrically decoupling the first power source from the automatic transfer switch and the common load bus;
    physically and electrically coupling the second power source to the automatic transfer switch bypass breaker and the common load bus;
    disrupting the emergency bypass operation;
    physically and electrically decoupling the second power source from the automatic transfer switch bypass breaker and the common load bus; and
    physically and electrically coupling a utility bypass breaker to the first power source and directly to the common load bus.

12. The method of claim 11, further comprising disrupting a normal bypass operation of the first power source.

13. The method of claim 11, further comprising maintaining physical and electrical isolation of the automatic transfer switch and the automatic transfer switch bypass breaker from the first and the second power source and the common load bus.

14. The method of claim 11, further comprising utilizing a kirk key system to physically and electrically isolate a component of the automatic transfer switch bypass breaker system.

15. The method of claim 13, further comprising:
terminating the bypass operation;
physically and electrically coupling the first power source and the second power source to supply power to the automatic transfer switch;
physically and electrically coupling the common load bus to the automatic transfer switch; and
providing power from the first and the second power source through the automatic transfer switch to the common load bus.

16. An automatic transfer switch system comprising:
a utility bypass breaker having a first breaker electrically couplable between a first power source and a load buss and a second breaker electrically couplable between a second power source and the load buss;
an automatic transfer switch bypass breaker having a first breaker electrically couplable between the first power source and an emergency panel and a second breaker electrically couplable between the second power source and the load buss; and
an automatic transfer switch having a first breaker, a second breaker and a third breaker, the first breaker electrically couplable between the automatic transfer switch bypass breaker and the third breaker, the second breaker electrically couplable between the automatic transfer switch bypass breaker and the third breaker, and the third breaker electrically couplable to the load buss.

* * * * *